United States Patent [19]

Benazzi et al.

[11] Patent Number: 6,007,698

[45] Date of Patent: *Dec. 28, 1999

[54] PROCESS FOR CRACKING HYDROCARBON FEEDS USING A CATALYST COMPRISING AN IM-5 ZEOLITE WHICH IS OPTIONALLY DEALUMINATED

[75] Inventors: Eric Benazzi, Chatou; HervéCauffriez, Bougival, both of France

[73] Assignee: Institut Francais du Petrole, France

[ * ] Notice: This patent is subject to a terminal disclaimer.

[21] Appl. No.: 09/013,264

[22] Filed: Jan. 26, 1998

[30] Foreign Application Priority Data

Jan. 24, 1997 [FR] France ..................... 97 00864

[51] Int. Cl.$^6$ ................................. C10G 11/05
[52] U.S. Cl. ..................... 208/120.01; 208/113
[58] Field of Search ............. 208/120.01, 113

[56] References Cited

U.S. PATENT DOCUMENTS

| | | | |
|---|---|---|---|
| 3,758,403 | 9/1973 | Rosinski et al. | 208/120 |
| 4,289,606 | 9/1981 | Gladrow et al. | 208/120 |
| 4,309,279 | 1/1982 | Chester et al. | 208/120 |
| 4,309,280 | 1/1982 | Rosinski et al. | 208/120 |
| 4,368,114 | 1/1983 | Chester et al. | 208/120 |
| 4,614,578 | 9/1986 | Chester et al. | 208/120 |

FOREIGN PATENT DOCUMENTS 0 142 313  5/1985  European Pat. Off. .

*Primary Examiner*—Walter D. Griffin
*Attorney, Agent, or Firm*—Millen, White, Zelano & Branigan, P.C.

[57] ABSTRACT

The present invention relates to the use of a catalyst comprising an IM-5 zeolite which has optionally been dealuminated and is at least partially in its acid form and a matrix which is normally amorphous or of low crystallinity, and optionally a Y zeolite with a faujasite structure, in a process for catalytic cracking of petroleum feeds.

18 Claims, No Drawings

PROCESS FOR CRACKING HYDROCARBON FEEDS USING A CATALYST COMPRISING AN IM-5 ZEOLITE WHICH IS OPTIONALLY DEALUMINATED

SUMMARY OF THE INVENTION

The present invention relates to the use of a catalyst comprising an IM-5 zeolite which has optionally been dealuminated and is at least partially in its acid form, optionally in combination with a Y zeolite and a matrix which is normally amorphous or of low crystallinity in a process for catalytic cracking of petroleum feeds. Such a process which is particularly suitable for cracking heavy petroleum fractions, can crack petroleum fractions to produce a large quantity of compounds containing 3 and/or 4 carbon atoms per molecule, more particularly propylene and isobutane.

Cracking hydrocarbon feeds to obtain high yields of very good quality motor gasoline was begun in the petroleum industry at the end of the 1930s. The introduction of fluid bed processes (FCC, Fluid Catalytic Cracking) or moving bed processes (such as TCC) in which the catalysts continuously circulate between the reaction zone and the regenerator (where it is freed of coke by combustion in the presence of a gas containing oxygen), constituted a great advance over the fixed bed technique. Fluidized bed units (FCC) are now much more widespread than moving bed processes. Cracking is normally carried out at about 500° C. at a total pressure which is close to atmospheric pressure, and in the absence of hydrogen.

The prior art is illustrated, for example, in European patent EP-A-0 142 313.

Since the beginning of the 1960s, the most widely used catalysts in cracking units have been zeolites, normally with a faujasite structure. Such zeolites, incorporated in an amorphous matrix, for example constituted by amorphous silica-alumina, and which can contain clays in a variety of proportions, are characterized by hydrocarbon cracking activities which are 1000 to 10,000 times higher than those of silica-alumina catalysts which are rich in silica which catalysts were used up to the end of the 1950s.

Near the end of the 1970s, the crude oil shortage and the increasing demand for high octane number gasoline led refiners to treat heavier and heavier crudes. Treating these latter constitutes a difficult problem for the refiner because of their high level of catalyst poisons, in particular metallic compounds (especially nickel and vanadium), unusual Conradson carbon numbers and, in particular, asphaltene compounds.

This need to treat heavy feeds and other more recent problems such as the gradual bet general removal of lead based additives from gasoline, and the slow but substantial increase in demand for middle distillates (kerosines and gas oils) in some countries have also prompted refiners to research improved catalysts which can in particular satisfy the following aims:

catalysts which are thermally and hydrothermally more stable and more tolerant towards metals;

which can produce less coke for an identical conversion;

which can produce a gasoline with a higher octane number;

which has improved selectively for middle distillates.

In the majority of cases, the production of light gases comprising compounds containing 1 to 4 carbon atoms per molecule is intended to be minimised and as a consequence, catalysts are designed to limit the production of such light gases.

However, in some particular cases demand for light hydrocarbons containing 2 to 4 carbon atoms per molecule, or some of them such as $C_3$ and/or $C_4$ hydrocarbons, more particularly propylene and butenes, has grown to a substantial level.

The production of a large quantity of butenes is particularly interesting when the refiner can use an alkylation unit, for example for $C_3$–$C_4$ cuts containing olefins, to form an additional quantity of high octane number gasoline. Thus the global high quality gasoline yield obtained from the starting hydrocarbon cuts is substantially increased.

The production of propyolene is particularly desirable in some developing countries where there is a high demand for such a product.

The catalytic cracking process can satisfy this demand to a certain extent provided that, in particular, the catalyst in adapted to such a production. One effective method of adapting the catalyst consists of adding an active agent to catalytic masses, the active agent having the following two qualities:

1. it can crack heavy molecules with good hydrocarbon selectivity for 3 and/or 4 carbon atoms, in particular to propylene and butenes;

2. it must be sufficiently resistant to the severe steam partial pressure and temperature conditions which prevail in the regenerator of the industrial cracker.

Research work carried out by the applicant on numerous zeolites has led to the surprising discovery that an IM-5 zeolite which may or may not be dealuminated and is at least partially in its acid form can produce a catalyst with excellent stability which has good selectivity for the production of hydrocarbons containing 3 and/or 4 carbon atoms per molecule.

The IM-5 zeolite in its hydrogen form of the present invention has a structure which has not yet been clarified. It has been described in French patent application 96/12873 dated Oct. 21, 1996, a partial description of which is hereby incorporated by way of reference.

The novel zeolitic structure, termed IM-5, has a chemical composition with the following formula, expressed in terms of the mole ratios of the oxides for the anhydrous state:

$$100XO_2, mY_2O_3, pR_{2/n}O$$

wherein m is up to 10;

p is up to 20;

R represents one or more cations with valence n;

X represents silicon and/or germanium, preferably silicon;

Y is aluminum, iron, gallium, boron, and/or titanium, Y preferably being aluminium; and is characterized by an X ray diffraction diagram, in its as synthesised state, which comprises the peaks shown in Table 1.

The IM-5 zeolite in its hydrogen form, designated H-IM-5, is obtained by calcining step(s) and/or ion exchange step(s) as will be explained below. The H-IM-5 zeolite has an X ray diffraction diagram which comprises the results shown in Table 2.

TABLE 1

X ray diffraction table for IM-5 zeolite in its as synthesized state

| $d_{hkl}$ (Å) | $I/I_{max}$ |
|---|---|
| 11.8 ± 0.35 | s to vs (1) |
| 11.5 ± 0.30 | s to vs (1) |
| 11.25 ± 0.30 | s to vs (1) |
| 9.95 ± 0.20 | m to s |
| 9.50 ± 0.15 | m to s |
| 7.08 ± 0.12 | w to m |
| 6.04 ± 0.10 | vw to w |
| 5.75 ± 0.10 | w |
| 5.65 ± 0.10 | w |
| 5.50 ± 0.10 | vw |
| 5.35 ± 0.10 | vw |
| 5.03 ± 0.09 | vw |
| 4.72 ± 0.08 | w to m |
| 4.55 ± 0.07 | w |
| 4.26 ± 0.07 | vw |
| 3.92 ± 0.07 | s to vs (2) |
| 3.94 ± 0.07 | vs (2) |
| 3.85 ± 0.05 | vs (2) |
| 3.78 ± 0.04 | s to vs (2) |
| 3.67 ± 0.04 | m to s |
| 3.55 ± 0.03 | m to s |
| 3.37 ± 0.02 | w |
| 3.30 ± 0.015 | w |
| 3.099 ± 0.012 | w to m |
| 2.970 ± 0.007 | vw to w |
| 2.815 ± 0.005 | vw to w |
| 2.720 ± 0.005 | vw |

(1) Peaks forming part of a feature.
(2) Peaks forming part of the same feature.

TABLE 2

X ray diffraction table for IM-5 zeolite (hydrogen form), H-IM-5, otained by calcining

| $d_{hkl}$ (Å) | $I/I_{max}$ |
|---|---|
| 11.8 ± 0.30 | s to vs (1) |
| 11.45 ± 0.25 | vs (1) |
| 11.20 ± 0.20 | s to vs (1) |
| 9.90 ± 0.15 | m to s |
| 9.50 ± 0.15 | m to s |
| 7.06 ± 0.12 | w to m |
| 6.01 ± 0.10 | vw to w |
| 5.70 ± 0.10 | w |
| 5.30 ± 0.10 | vw |
| 5.03 ± 0.09 | vw |
| 4.71 ± 0.08 | w |
| 4.25 ± 0.07 | vw |
| 3.87 ± 0.07 | m to s (2) |
| 3.81 ± 0.05 | m to s (2) |
| 3.76 ± 0.04 | m to s (2) |
| 3.67 ± 0.04 | w to m |
| 3.54 ± 0.04 | m to s |
| 3.37 ± 0.03 | w |
| 3.316 ± 0.015 | w |
| 3.103 ± 0.012 | w |
| 3.080 ± 0.010 | w to m |
| 2.950 ± 0.010 | vw to w |
| 2.880 ± 0.007 | vw |
| 2.790 ± 0.005 | vw |
| 2.590 ± 0.005 | vw |

(1) Peaks form part of a feature.
(2) Peaks form part of the same feature.

These diagrams were obtained using a diffractometer and a conventional powder method utilizing the $K_\alpha$ line of copper. From the position of the diffraction peaks represented by the angle 2θ, the characteristic interplanar distances $d_{hkl}$ of the sample can be calculated using the Bragg equation. The intensity is calculated on the basis of a relative intensity scale attributing a value of 100 to the line representing the strongest peak on the X ray diffraction diagram, and then:

very weak (vw) means less than 10;
weak (w) means less than 20;
medium (m) means in the range 20 to 40;
strong(s) means in the range 40 to 60;
very strong (vs) means more than 60.

The X ray diffractograms from which the data are obtained (spacing d and relative intensities) are characterized by broad reflections with a large number of peaks forming shoulders on other peaks of higher intensity. Some or all of the shoulders may not be resolved. This may be the case for samples with low crystallinity or for samples with crystals which are small enough to produce significant broadening of the X rays. This can also be the case when the equipment or operating conditions used to produce the diagram differ from those used in the present case.

In the chemical composition defined above, m is generally in the range 0.1 to 10, preferably 0.3 to 9, and more preferably 0.5 to 8; it appears that IM-5 zeolite is generally and most readily obtained in a very pure form when m is in the range 0.8 to 8.

IM-5 zeolite is considered to have a novel basic structure or topology which is characterized by its X ray diffraction diagram. IM-5 zeolite in its "as synthesised state" has substantially the X ray diffraction characteristics shown in Table 1, and is thus distinguished from prior art zeolites. Similarly H-IM-5 zeolite, obtained by calcining and/or ion exchange steps, has substantially the characteristics shown in Table 2. The invention described in French patent application 96/12873 dated Oct. 21, 1996 also concerns any zeolite with the same structural type as that of IM-5 zeolite.

Further, certain catalytic applications require an adjustment to the thermal stability and acidity of the zeolite to the envisaged reaction. One method for optimizing the acidity of a zeolite is to reduce the quantity of aluminum present in the framework. The Si/Al ratio of the framework can be regulated on synthesis or after synthesis. This operation, known as dealumination, has to be carried out with the little destruction of the crystalline structure as possible.

The skilled person is aware that dealumination of the framework of the zeolite leads to a solid which is thermally more stable. However, dealumination treatments undergone by zeolites lead to the formation of extra-framework aluminium species which can block the micropores of the zeolite if they are not eliminated. As an example, this is the case in zeolites used as additives to the catalytic cracking catalyst used in FCC units for the production of olefins. High temperatures of over 600° C. prevail in the cracking unit regenerator and the non negligible steam pressure could lead to dealumination of the zeolite framework and as a result to a loss in acid sites and blocking of the micropores. These two phenomena together lead to a reduction in activity and thus of the efficiency of the zeolitic additive.

Controlled dealumination carried out outside the unit can precisely regulate the degree of dealumination of the zeolite framework and can also eliminate extra-framework aluminium species which block the micropores in contrast to that which occurs in the cracking unit, as explained in the preceding paragraph. The post-synthesis dealumination step can be carried out using any technique which is known to the skilled person; non limiting examples are any heat treatment, optionally carried out in the presence of steam, followed by at least one acid attack step using at least one solution of a mineral or organic acid, or any dealumination step using at least one acid attack step using at lest one mineral or organic acid.

The present invention thus provides a process for catalytic cracking of hydrocarbon feeds, characterized by the use of a cracking catalyst comprising at least one IM-5 zeolite which is at least partially, preferably practically completely in its acid form and which has optionally been dealuminated.

When it has been dealuminated, the zeolite is generally dealuminated by at least one heat treatment step, optionally in the presence of stream, followed by at least one acid attack step using at least one solution of a mineral or organic acid, or by at least one acid attack step using at least one solution of a mineral or organic acid.

The IM-5 zeolite comprised in a catalyst used in the process of the invention, when it has been dealuminated, comprises silicon and at least one element T selected from the group formed by aluminium, iron, gallium and boron, preferably aluminium. It has a global Si/T atomic ratio of over 5, preferably over 10, more preferably over 15, and still more preferably in the range 20 to 400.

The matrix is generally selected from elements of the group formed by clays (for example natural clays such as kaolin or bentonite), magnesia, aluminas, silicas, titanium oxide, boron oxide, zirconia, aluminium phosphates, titanium phosphates, zirconium phosphates, silica-aluminas and coal, preferably from elements of the group formed by aluminas and clays.

When it is comprised in the catalyst used in the process of the invention, the IM-5 zeolite is at least partially, preferably practically completely in its acid for, i.e., in its hydrogen (H') form. The Na/T atomic ratio is generally less than 0.45 and preferably less than 0.30, more preferably again less than 0.15.

The global T/Al ratio of the zeolite and the chemical composition of the samples are determined by X ray fluorescence and atomic absorption.

The microporous volume can also be estimated from the quantity of nitrogen absorbed at 77 K for a partial pressure $P/P_0$ of 0.19, for example.

To prepare the dealuminated IM-5 zeolite in the preferred case where T is Al, two dealumination methods can be used starting from as synthesised IM-5 zeolite comprising an organic structuring agent. These are described below. However, any other method which is known to the skilled person can also be used.

The first method, direct acid attack, comprises a first calcining step carried out in dry air, at a temperature which is generally in the range 450° C. to 550° C., which eliminates the organic structuring agent present in the micropores of the zeolite, followed by a step in which the zeolite is treated with an aqueous solution of a mineral acid such as $HNO_3$ or HCl or an organic acid such as $CH_3CO_2H$. This latter step can be repeated as many times as is necessary to obtain the desired degree of dealumination. Between these two steps, one or more ion exchange steps can be carried out using at least one $NH_4NO_3$ solution, to at least partially and preferably almost completely eliminate the alkaline cation, in particular sodium. Similarly, at the end of the direct acid attack dealumination step, one or more optional ion exchange steps can be carried out using at least one $NH_4NO_3$ solution to eliminate residual alkaline cations, in particular sodium.

In order to obtain the desired Si/Al ratio, the operating conditions must be correctly selected; the most critical parameters in this respect are the temperature of the treatment with the aqueous acid solution, the concentration of the latter, its nature, the ratio between the quantity of acid solution and the mass of the treated zeolite, the treatment period and the number of treatments carried out.

The second method, heat treatment (in particular using steam, by steaming)+acid attack, comprises firstly calcining in dry air at a temperature which is generally in the range 450° C. to 550° C., to eliminate the organic structuring agent occluded in the microporosity of the zeolite. The solid obtained then undergoes one or more ion exchanges using at least one $NH_4NO_3$ solution, to eliminate at lest a portion, preferably practically all of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 550° C. to 900° C. and optionally followed by at least one acid attack using an aqueous solution of a mineral organic acid. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the same reason, the number of heat treatment-acid attack cycles can be varied.

In the preferred case when T is Al, the framework dealumination cycle, comprising at least one heat treatment step, optionally and preferably carried out in the presence of steam, and at least one attack step carried out in an acid medium on the IM-5 zeolite, can be repeated as often as in necessary to obtain the dealuminated IM-5 zeolite having the desired characteristics. Similarly, following the heat treatment, optionally and preferably carried out in the presence of steam, a number of successive acid attacks can be carried out using different acid concentrations.

In a variation of this second calcining method, heat treatment of the IM-5 zeolite containing the organic structuring agent can be carried out at a temperature which is generally in the range 550° C. to 850° C., optionally and preferably in the presence of steam. In this case, the steps of calcining the organic structuring agent and dealumination of the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally be subjected to at least one ion exchange step using at least one $NH_4NO_3$ solution, to eliminate practically all of the alkaline cations, in particular sodium, present in the cationic position in the zeolite.

In order to characterize the ability of zeolites comprised in the catalysts used in the catalytic cracking process of the invention to produce light olefins containing 3 and 4 carbon atoms, we have developed a specific catalytic cracking test. This test, which involves the catalytic cracking of methylcyclohexane, can measure hydrogen transfer which characterises the ability of zeolites, in particular dealuminated IM-5 zeolites, but also more generally all molecular sieves to produce or not to produce olefins.

This test involves fixed bed catalytic cracking of methylcyclohexane using zeolites at a temperature of 500° C. at atmospheric pressure. The methylcyclohexane flow rate and the mass of molecular sieves are regulated such that a large conversion range is covered.

We have discovered that measuring the $iC_r/iC_4^-$ molar ratio is an excellent index of the ability of a zeolite to produce olefins. This index, termed the hydrogen transfer index (HTI), characterizes hydrogen transfer reactions which are side reactions which saturate the olefins produced by cracking. As a result, this index will be lower when a zeolite transfers little hydrogen and thus produces a lot of light olefins. In general, the $iC_4/iC_4^=$ molar ratio, i.e., the HTI, is measured for a 40% methylcyclohexane conversion; the value obtained is then termed the hydrogen transfer index at 40% methylcyclohexane conversion and is given the symbol $HTI_{40}$. A hydrogen transfer index (HTI) can also be determined for lower or higher conversions, and the different values obtained for the same methylcyclohexane conversion are compared.

Non limiting examples of $HTI_{40}$ for a number of zeolites which are not in accordance with the zeolites used in the processes of the invention are given in Table 3 below.

TABLE 3

| Structural type (zeolite) | $HTI_{40}$ |
|---|---|
| FAU (Y Si/Al = 19) | 6.4 |
| MAZZ (Omega Si/Al = 17) | 5.7 |
| MOR (Mordenite Si/Al = 18) | 3.6 |
| NES (NU-87 Si/Al = 17.5) | 2.4 |

This table shows that the HTI depends greatly on the structure of the zeolite and that Y zeolite leads to a high hydrogen transfer index.

The catalyst used in the process of the present invention also optionally comprises a Y structure with a faujasite structure ("Zeolite Molecular Sieves: Structure, Chemistry and Uses", D. W. BRECH, J. WILEY and sons, 1973), as is well known to the skilled person. Of the Y zeolites which can be used, a stabilized Y zeolite generally known as ultrastable or USY zeolite is preferably used, either in its at least partially exchanged form with metallic cations, for example cations of alkaline-earth metals and/or cations of rare earth metals with atomic number 57 to 71 inclusive, or in its hydrogen form.

The catalyst used in the process of the present invention also comprises at least one matrix, which is normally amorphous or of low crystallinity, generally selected from the group formed by alumina, silica, magnesia, clay, titanium oxide, zirconia and boron oxide.

The catalyst used in the process of the invention generally comprises:

a) 20% to 95% by weight, preferably 30% to 85%, and more preferably 50% to 80%, of at least one matrix;

b) 1% to 60% by weight, preferably 4% to 50%, more preferably 10% to 40%, of at least one Y zeolite with a faujasite structure; and c) 0.1% to 30% by weight, preferably 0.05% to 20%, more preferably 0.1% to 10%, of at least one IM-5 zeolite, which has optionally been dealuminated and is at lest partially in its acid form.

The catalyst used in the process of the present invention can be prepared using any of the methods known to the skilled person.

Thus the catalyst can be obtained by simultaneous incorporation of the IM-5 zeolite described above the Y zeolite using conventional methods for preparing cracking catalysts containing a zeolite.

The catalyst can also be obtained by mechanically mixing a first product containing a matrix and a Y zeolite, and a second product comprising the IM-5 zeolite with a matrix which can be identical or different to that contained in the first product. This mechanical mixture is normally formed using dry products. The products are preferably dried by spray-drying, for example at a temperature of 100° C. to 500° C., normally for 0.1 to 30 seconds. After spray drying, these products can still contain about 1% to 30% by weight of volatile material (water and ammonia).

The IM-5 zeolite-matrix mixture normally contains 1% to 90% by weight, preferably 5% to 60% by weight, of IM-5 zeolite with respect to the total weight of the mixture.

The Y zeolite-matrix mixture used to prepare the catalyst used in the process of the present invention is normally a conventional prior art catalytic cracking catalyst (for example a commercially available catalyst); the IM-5 zeolite described above can then be considered to be an additive which can be used as it is, with a view to mixing it with the conventional cracking catalyst defined above, or it may already have been incorporated in a matrix, the matrix-IM-5 zeolite ensemble then constituting the additive which is mixed with the conventional catalytic cracking catalyst defined above, after suitable forming, for example by mechanically mixing grains containing the IM-5 zeolite and grains of a conventional cracking catalyst.

Thus in a first implementation of the process of the invention, the cracking catalyst comprises an FCC additive which is IM-5 zeolite formed on a matrix and a conventional cracking catalyst comprising a Y zeolite with a faujasite structure and a matrix. In a second implementation of the process of the invention, the cracking catalyst comprises IM-5 zeolite and Y zeolite formed in the same matrix.

The general conditions for catalytic cracking reactions are well known to the skilled person (see for example, U.S. Pat. Nos. 3,293,192; 3,449,070; 4,415,438; 3,518,051 and 3,607,043).

With the aim of producing the largest possible quantity of gaseous hydrocarbons containing three and/or four carbon atoms per molecule, in particular propylene and butenes, it is sometimes advantageous to slightly increase the temperature at which cracking is carried out, for example from 10° C. to 50° C. The catalyst used in the process of the present invention is, however, usually sufficiently active for such a temperature increase not to be necessary. The other cracking conditions are unchanged with respect to those used in the prior art. The catalytic cracking conditions are generally as follows:

contact time in the range 1 to 10000 milliseconds;

catalyst to feed weight ratio (C/F) in the range 0.5 to 50;

temperature in the range 400° C. to 800° C.;

pressure in the range 0.5 to 10 bars (1 bar=0.1 MPa).

EXAMPLES

The following examples illustrate the invention without in any way limiting its scope.

Example 1

Preparation of H-IM-5/1 zeolite, in accordance with the invention

The stating material was an IM-5 zeolite with a global Si/Al atomic ratio of 11.1, and a sodium weight content such that the Na/Al atomic ratio was 0.031. This IM-5 zeolite was synthesized in accordance with French patent application 96/12873 dated Oct. 21, 1996.

This IM-5 zeolite first underwent dry calcining at 550° C. in a stream of air for 6 hours. The solid obtained underwent four ion exchange steps in a solution of 10N $NH_2NO_3$ at about 100° C. for 4 hours for each exchange step. The solid obtained was designated as H-IM-5 and had an Si/Al ratio of 11.1 and an Na/Al ratio of 0.0015.

Example 2
Preparation of catalyst C1, in accordance with the invention

The H-IM-5/1 zeolite obtained from Example 1 was used to prepare a cracking additive by mechanical mixing of 30% by weight of H-IM-5/1 zeolite in its dry hydrogen form with 70% by weight of amorphous silica, which had been calcined and which had a grain size which was comparable to that of the H-IM-5/1 in its hydrogen form.

The additive obtained was pelletized, then reduced to small aggregates using a crusher. The fraction of grains with a size in the range 40 μm to 200 μm was then recovered by seiving. This additive was termed A1 and thus contained 30% by weight of H-IM-5/1 zeolite.

This additive then underwent hydrothermal treatment at 750° C. for 4 hours in the presence of 100% of steam. Additive A1 thus obtained was mechanically mixed with a CAT catalyst which contained a silica-alumina matrix and 30% by weight of an ultrastable Y zeolite (USY) with a lattice parameter of 24.26 Å, to obtain a catalyst C1.

Example 3
Preparation of H-IM-5/2 zeolite, in accordance with the invention

The starting material was the same IM-5 zeolite as that used in Example 1. Firstly, this IM-5 zeolite underwent dry calcining at 550° C. in a stream of dry air and nitrogen for 6 hours. The solid obtained then underwent ion exchange in a 10N $NH_4NO_3$ solution at about 100° C. for 4 hours. The IM-5 zeolite then underwent treatment with a 4N nitric acid solution at about 100° C. for 5 hours. The volume V of the nitric acid solution used (in ml) was 10 times the weight W of the dry IM-5 zeolite (V/W=10). This treatment with a 4N nitric acid solution was carried out a second time under the same operating conditions.

After these treatments, the zeolite obtained was designated as H-IM-5/2. It was in its H form and had a global Si/Al atomic ratio of 31.5 and an Na/Al ratio of less than 0.001.

Example 4
Preparation of catalyst C2 in accordance with the invention

The H-IM-5/2 zeolite obtained from Example 3 was used to prepare an additive A2 and a catalyst C2 using the same procedure as that described for Example 2.

Example 5
Preparation of H-IM-5/3, in accordance with the invention

The IM-5 zeolite used in this example was the $NH_4$-IM-5 zeolite prepared in Example 1 of the present invention. The $NH_4$-IM-5 zeolite underwent hydrothermal treatment in the presence of 100% of steam at 650° C. over 4 hours. The zeolite then underwent acid attack using 6N nitric acid at about 100° C. for 4 hours, to extract the extra-framework aluminium species formed during the hydrothermal treatment. The volume V of the nitric acid solution used (in ml) was 10 times the weight W of the dry IM-5 zeolite (V/W=10).

After these treatments, the H-IM-5/3 zeolite in its H form had a global Si/Al atomic ratio of 28.2 and an Na/Al ratio of less than 0.001.

Example 6
Preparation of catalyst C3 in accordance with the invention

The H-IM-5/3 zeolite obtained from Example 5 was used to prepare an additive A3 and a catalyst C3 using the same procedure as that described for Example 2.

Example 7
Evaluation of hydrogen transfer index of additives A1, A2 and A3, in accordance with the invention Catalytic evaluations of the additives were carried out in a fixed bed at atmospheric pressure and at a temperature of 500° C. The feed used was methylcyclohexane. The methylcyclohexane was introduced into the reactor diluted with nitrogen in a $H_2$/HC molar ratio of 12 and at a flow rate such that conversion was 40% by weight of the conversion.

Values for the hydrogen transfer indices obtained for additives A1, A2 and A3 are shown in Table 4 below.

TABLE 4

| Additives | $HTI_{40}$ |
| --- | --- |
| A1 | 0.90 |
| A2 | 0.70 |
| A3 | 0.65 |

The values obtained show that dealumination treatments carried out on IM-5 zeolites lead to solids which produce fewer hydrogen transfer reactions than the non dealuminated zeolite.

Example 8
Evaluation of catalytic properties for cracking a real feed in a MAT unit, using catalysts C1, C2, C3, in accordance with the invention The cracking reaction was carried out in a MAT unit on a vacuum gas oil type feed, the characteristics of which are given below.

| | |
| --- | --- |
| Density, 60° C. | 0.918 |
| Refractive index at 67° C. | 1.4936 |
| Aniline point, ° C. | 76 |
| Sulphur, weight % | 2.7 |

The cracking temperature was 520° C. Table 5 shows valued for the catalytic properties of catalysts C1 to C3.

TABLE 5

Cracking a vacuum gas oil using catalysts C1, C2, C3

| | C1 | C2 | C3 |
| --- | --- | --- | --- |
| C/O | 0.7 | 0.9 | 1.1 |
| % conversion | 86 | 86 | 87 |
| C1–C4 gas, wt % | 32.4 | 35.6 | 39.4 |
| Gasoline, wt % | 42.2 | 39.7 | 37.2 |
| Gas oil, wt % | 8.2 | 7.7 | 6.7 |
| Coke, wt % | 2.5 | 2.2 | 2.9 |
| $C3^-$, wt % | 7.4 | 7.8 | 9.1 |
| $\Sigma C4^-$, wt % | 9.1 | 9.3 | 10.5 |

Gasoline (wt %): Represents the percentage by weight of liquid compounds formed during the cracking test and wherein the boiling points are in the range 160° C. to 221° C.
Gas oil (wt %): Represents the percentage by weight of liquid compounds formed during the cracking test and in which the boiling points are in the range 221° C. to 350° C.
Coke (wt %): Represents the percentage by weight of compounds in which the boiling points are over 350° C.
$C3^-$ (wt %): Represents the percentage by weight of olefins containing 3 carbon atoms (propylene) formed during the cracking test.
$\Sigma C4^-$ (wt %): Represents the percentage by weight of olefins containing 4 carbon atoms formed during the cracking test.

Catalysts C1, C2, C3, in accordance with the invention, at iso-conversion or iso-coke, produced higher gas yields as the HTI decreased. Further, the gases produced with catalysts C1, C2, C3 were more olefinic as the HTI decreased. The influence of the HTI on the production of light olefins during cracking of a real feed is thus particularly clear.

We claim:

1. A process for catalytic cracking of hydrocarbon feeds, comprising subjecting a hydrocarbon feed to effective cracking conditions in the presence of a cracking catalyst comprising at least one IM-5 zeolite which is at lest partially in acid form.

2. A process according to claim 1, in which said IM-5 zeolite has been dealuminated.

3. A process according to claim 1, in which said zeolite comprises silicon and at least one element T which is aluminium, iron, gallium or boron, and the zeolite has a global Si/T atomic ratio of more than 5.

4. A process according to claim 3, wherein the zeolite has a global Si/T atomic ratio of more than 10.

5. A process according to claim 3, wherein the zeolite has a global Si/T atomic ratio of more than 15.

6. A process according to claim 3, wherein the zeolite has a global Si/T atomic ratio of 20 to 400.

7. A process according to claim 1, wherein the zeolite is essentially in its acid form.

8. A process according to 1, in which said catalyst also comprises at least one matrix.

9. A process according to claim 8, in which said matrix is alumina, silica, magnesia, clay, titanium oxide, titanium phosphate, coal, zirconium phosphate, or boron oxide.

10. A process according to claim 1, in which the catalyst also comprises a Y zeolite with a faujasite structure.

11. A process according to claim 1 in which the catalyst comprises:

a) 20% to 95% by weight of at least one matrix;

b) 1% to 60% by weight of at least one Y zeolite with a faujasite structure; and c) 0.01% to 30% by weight of at least one IM-5 zeolite which has optionally been dealuminated and is at least partially in its acid form.

12. A process according to claim 1, in which the cracking catalyst comprises an FCC additive which is IM-5 zeolite formed on a matrix, and a conventional catalyst comprising a Y zeolite with a faujasite structure, and a matrix.

13. A process according to claim 1, in which the cracking catalyst comprises IM-5 zeolite and Y zeolite, formed in the same matrix.

14. A process according to claim 1, wherein the IM-5 zeolite has the formula $100XO_2$, $mY_2O_3$, $pR_{2/n}O$ wherein m is up to 10;

p is up to 20;

R represents one or more cations with a valence n;

X represents silicon and/or germanium; and

Y is aluminium, iron, gallium, boron, and/or titanium.

15. A process according to claim 1, wherein the IM-5 zeolite in its as-synthesized state has the X-ray diffraction characteristics as set forth in Table 1 in the specification.

16. A process according to claim 1, wherein the IM-5 zeolite in its hydrogen form has the X-ray diffraction characteristics as set forth in Table 2 in the specification.

17. A process according to claim 3, wherein the zeolite has a Na/T ratio of less than 0.45.

18. A process according to claim 1, wherein the zeolite is prepared by a process comprising calcining an as-synthesized IM-5 zeolite, contacting the calcined zeolite with an aqueous mineral acid, and optionally ion exchanging the calcined and acid treated zeolite to eliminate alkaline cations.

* * * * *